United States Patent [19]

Cabato et al.

[11] Patent Number: 5,142,602
[45] Date of Patent: Aug. 25, 1992

[54] FIBER OPTIC CONNECTORS

[75] Inventors: Nellie L. Cabato, Plymouth Meeting; LeRoy Tabb, Doylestown, both of Pa.; Nicholas Volinic, St. Paul, Minn.; Laurence N. Wesson, Blue Bell, Pa.

[73] Assignee: Labinal Components & Systems, Inc., Elk Grove Village, Ill.

[21] Appl. No.: 776,689

[22] Filed: Oct. 15, 1991

Related U.S. Application Data

[63] Continuation of Ser. No. 403,097, Sep. 5, 1989, abandoned.

[51] Int. Cl.⁵ .............................................. G02B 6/36
[52] U.S. Cl. ........................................ 385/87; 385/81
[58] Field of Search ...................... 350/96.2, 96.21; 385/78, 81, 84, 86, 87

[56] References Cited

U.S. PATENT DOCUMENTS

| | | | |
|---|---|---|---|
| 3,141,924 | 7/1964 | Forney, Jr. | 174/75 C |
| 3,679,895 | 7/1987 | Huber | 350/96.2 |
| 3,936,145 | 2/1976 | McCartney | 350/96.22 |
| 3,947,182 | 3/1976 | McCartney | 350/96.22 |
| 4,047,797 | 9/1977 | Arnold et al. | 350/96.2 |
| 4,133,601 | 1/1979 | Le Guen et al. | 350/96.21 |
| 4,190,316 | 2/1980 | Malsby et al. | 350/96.18 |
| 4,190,317 | 2/1980 | Makuch | 350/96.2 |
| 4,247,163 | 1/1981 | Lumpp et al. | 350/96.21 |
| 4,257,674 | 3/1981 | Griffin et al. | 350/96.21 |
| 4,279,466 | 7/1981 | Makuch et al. | 350/96.21 |
| 4,300,815 | 5/1981 | Malsot | 350/96.2 |
| 4,325,607 | 4/1982 | Carlsen | 350/96.21 |
| 4,336,977 | 6/1982 | Monaghan et al. | 350/96.2 |
| 4,339,172 | 7/1982 | Leather | 350/96.21 |
| 4,421,383 | 12/1983 | Carlsen | 350/96.2 |
| 4,440,469 | 4/1984 | Schumacher | 174/705 |
| 4,593,970 | 6/1986 | Rhodes | 350/96.2 |
| 4,679,895 | 7/1987 | Huber | 350/96.21 |
| 4,779,949 | 10/1988 | Iri et al. | 350/96.21 |
| 4,784,455 | 11/1988 | Sladen et al. | 350/96.2 |
| 4,804,252 | 2/1989 | Betzler et al. | 350/96.23 |
| 4,810,053 | 3/1989 | Woith | 350/96.2 |
| 4,834,489 | 5/1989 | Betzler et al. | 350/96.2 |

FOREIGN PATENT DOCUMENTS

| | | |
|---|---|---|
| 60-63506 | 4/1985 | Japan. |
| 2180955A | 4/1987 | United Kingdom. |
| 2210994A | 6/1989 | United Kingdom. |

*Primary Examiner*—Akm E. Ullah
*Assistant Examiner*—John Ngo
*Attorney, Agent, or Firm*—Leydig, Voit & Mayer

[57] ABSTRACT

A fiber optic terminus assembly for use in a fiber optic connector is disclosed in which a gripper element and a radially deformable ferrule are compressed into gripping engagement with the optical fiber portion of an optical cable. A terminus body and a contact sleeve engage the outer layer of the optical cable and the ferrule and position the fiber at a preselected distance from a lens surface.

23 Claims, 2 Drawing Sheets

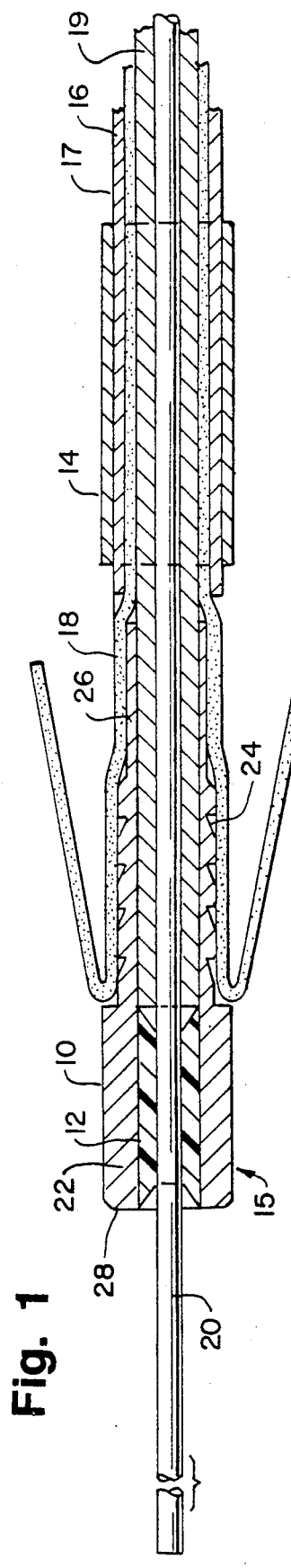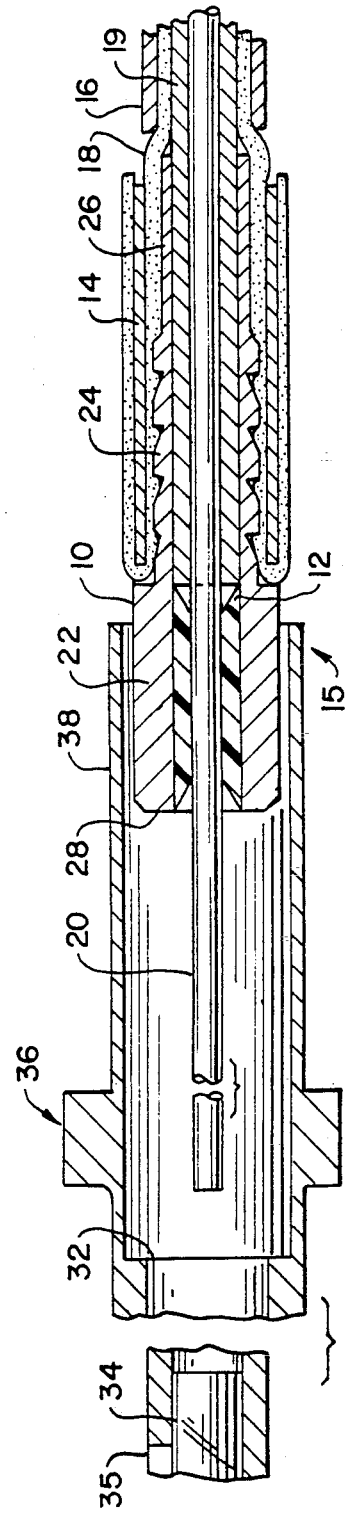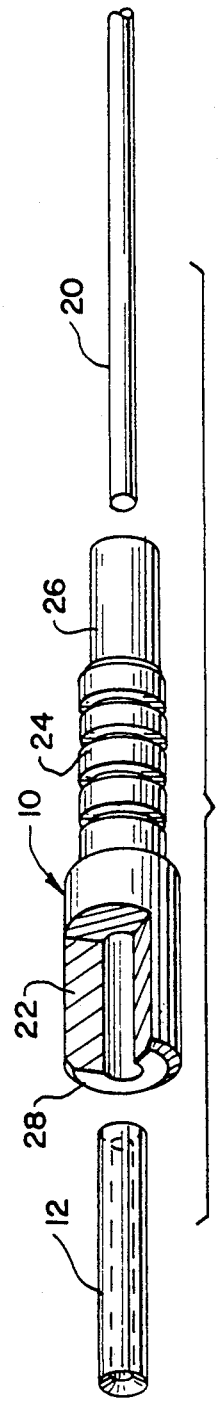

FIBER OPTIC CONNECTORS

CROSS REFERENCE TO RELATED APPLICATIONS

This is a continuation of application Ser. No. 07/403,097, filed Sep. 5, 1989, and now abandoned, the text of which is hereby incorporated by reference.

The invention relates to connectors for providing the mechanical and optical interconnection between optical fibers. More particularly, the invention relates to a fiber optic terminus that provides strain relief for the fiber portion as well as surrounding strength layers of the cable and that self-aligns the end of the fiber portion within a focal zone in a lens-type connection. The terminus of the present invention is relatively simple in construction, and is simple to install while being effective in operation.

BACKGROUND OF THE INVENTION

The use of fiber optics as a transmission medium provides communication of data at high speeds, great reliability, and relatively low cost. However, the installation and maintenance requirements of fiber optic networks have posed practical difficulties. Principal among these difficulties is the interconnection of pairs of fiber optic cables. Typically, fiber optic termini require precise alignment between two extremely small fiber cores in order to provide low-loss signal transmission. Alternatively, a lens arrangement may be placed between the two fibers, but precise alignment and axial positioning over a wide range of environmental conditions are still necessary. With either mode of connection, it is important to capture the fiber end at a closely controlled location, because the position of the fiber end, relative to either the other fiber end or to a lens, has a critical impact on the efficiency of the optical interconnection.

Fiber optic connectors in general are very susceptible to longitudinal forces on the fiber. Retention of the fiber forming the interconnection is therefore another frequent problem. Each fiber must be secured to prevent relative movement of the fibers since virtually any movement will adversely effect the quality of the interconnection. The physical attachment of the fiber, however, must avoid the application of undue stress on the fiber, which may cause microbend attenuation or, possibly, eventual breakage of the fiber due to stress fatigue. Further, the fiber ends must be kept clean and protected, both in the mated condition and in the open, unmated position. The fiber core sizes which are typically of interest, usually 50 to 200 microns, necessitate attention to the control of dirt and field cleanability.

Known fiber optic connectors usually employ the coupling of the ends of two connecting fibers. The ends of the fibers are glued or otherwise secured into ferrule subassemblies which are then brought into actual or virtual contact within a common alignment sleeve. Such connectors, however, tend to fail when the glue or adhesive employed to secure the fibers degrades after extended use. Further, such connectors tend to misalign upon the application of rotational, longitudinal or lateral forces.

Other types of fiber optic connectors, including known lens types, while they perform satisfactorily under certain circumstances, are overly complex and difficult to install and maintain. The assembly of complex mechanical parts associated with such connectors involves considerable wasted effort owing to aligning the fiber within the connector and completing the mechanical connection of the cable. Moreover, such complex systems typically suffer breakdowns after extended periods of use.

SUMMARY OF THE PRESENT INVENTION

Therefore, it is an object of the present invention to provide an improved fiber optic terminus. More specifically, it is an object of the present invention to provide a novel mode for capturing an optical fiber against the forces that tend to displace it.

It is another object of the present invention to provide a fiber optic terminus having separate locations for securing the fiber core and the surrounding strength layer of a fiber optic cable.

It is still another object of the present invention to provide a fiber optic terminus which is self aligning upon completion of the interconnection between two fiber cores.

It is still another object of the present invention to provide a fiber optic terminus that may be easily installed, even with hand tools, requiring far less time than known termini, yet which provides good gripping of the fiber and accurate positioning of the fiber end and also maintains a high degree of stress relief engagement with the cable.

It is still another object of the present invention to provide a fiber optic terminus that is durable and reliable.

It is a further object of the present invention to provide fiber optic termination within a small profile such as within a space normally providing a conventional electrical contact.

Generally, the objects of the present invention are accomplished in a terminus that provides one half of an optical connection in a lens type arrangement by securing a fiber optic cable at its fiber and its surrounding strength layer. To effect the termination, at least a portion of the strength layer is removed from the fiber. A novel compressible ferrule is placed between the exposed fiber and the removed strength layer and includes a head section having a reference surface at its distal end and a serrated tail section. The ferrule includes a compressible fiber gripping insert having a centrally disposed aperture that receives the exposed fiber. Advantageously, the head section surrounds the insert and is crimped around the insert directly on the fiber to securely grip the fiber. The strength layer is placed between the serrated portion of the ferrule and the inner surface of a compressible sleeve member. The strength layer is thereafter backfolded over the outer surface of the sleeve member. The fiber is then cleaved to length, as by an appropriate tool. A terminus body including an annular end section is advanced over the assembly including the ferrule, insert, sleeve, and cable. In accordance with an important feature of the invention, the terminus body includes a reference stop which is positioned at a preselected distance from a lens surface. When the body is crimped in place, the ferrule reference surface abuts the reference stop, thereby aligning the fiber end at a known distance from the lens surface.

While the invention disclosed herein has been described primarily with reference to termini for interconnection of a pair of fiber, it is understood that it is within the scope of the invention to provide termini having an array of locations for interconnecting multiple fibers which incorporates the same novel features. Further, while the terminus of the present invention will be described herein as generally cylindrical, it will be understood that other geometrical configurations may be utilized.

BRIEF DESCRIPTION OF THE DRAWINGS

FIG. 1 is a detailed cross sectional view of a fiber optic terminus subassembly employing teachings of the present invention.

FIG. 2 is a detailed cross sectional view of the subassembly of FIG. 1 mating within an outer contact body to form a fiber optic pin terminus.

FIG. 3 is an exploded perspective view of the ferrule and gripping insert of FIG. 1.

DETAILED DESCRIPTION OF THE PREFERRED EMBODIMENT

The following detailed description will permit a more complete understanding of this invention. However, the embodiments described below are simply examples of the invention and the invention is not limited to these embodiments. Furthermore, the drawings are not necessarily to scale. In certain instances, details may have been omitted which are not necessary for an understanding of the present invention.

Generally, the present invention relates to a terminus for interconnecting a pair of fiber optic cables. The device of this invention is intended to be used in the type of optical terminating arrangement using a lens expanded beam system wherein a first lens is employed to capture and collimate the light emerging from one fiber and project the light to a second lens. The second lens receives the light and refocuses the light on a receiving fiber.

Figure 4:
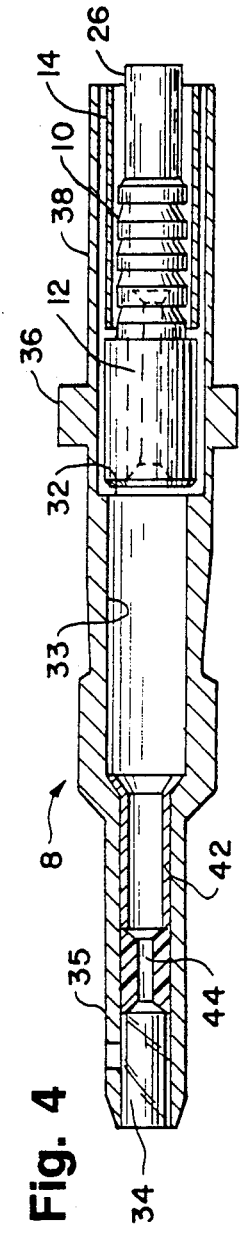
FIG. 4 is a cross sectional view of a pin terminus assembly for forming one half of an optical fiber termination, as in FIG. 1 but without the optical fiber cable.
Figure 5:
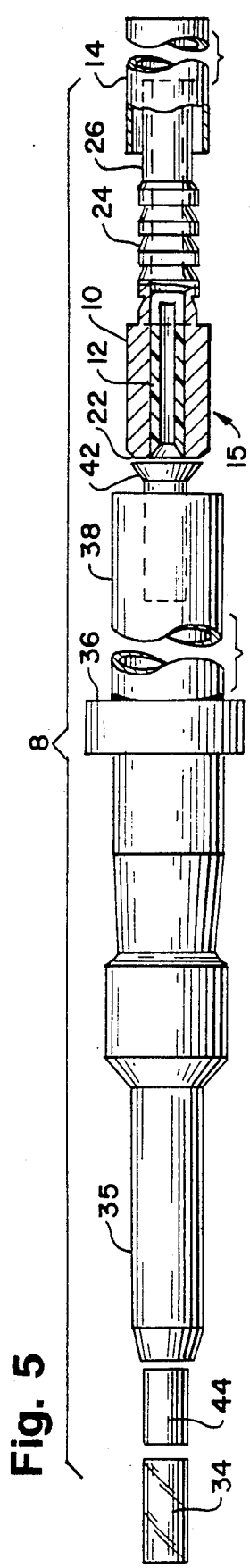
FIG. 5 is an exploded cross sectional view of the pin assembly of FIG. 4.

Turning first to FIG. 4 and also to FIG. 5, therein is shown the assembled components of a pin terminus assembly 8 for forming one half of a fiber optical connection. The pin terminus 8 includes a buffer ferrule 10 and gripping insert 12, and a crimp sleeve 14, for forming a subassembly 15 which is further illustrated in FIGS. 1-3. As discussed further below, the terminus 8 also includes an outer terminus body 36, a lens 34, an alignment sleeve 42 and a fiber guide 44.

Turning now to FIG. 1, the fiber optic connector 8 has a particular application for use with a fiber optic cable 17 having a fiber portion 20 which transmits and receives optical waves, an inner jacket layer 19, an intermediate strength layer 18 that encloses the fiber portion 20 and the inner jacket layer 19, and an outer layer 16. Typically, the intermediate strength layer 18 of the cable 17 is formed of a durable material. For example, the strength layer 18 may be fabricated of braided Kevlar or fiberglass to minimize stress on the fiber. The fiber portion in the illustrated embodiment is a single cylindrical fiber having, for example, a diameter of 140 or 250 microns.

As is shown in FIG. 1 and also in FIG. 3, the ferrule 10 is formed with a head portion 22 including an end surface 28 that provides a reference plane for the buffer ferrule subassembly 15 as will be noted further below, and a tail section 26 which includes a serrated gripping portion 24. The tail section 26 interfits between the strength layer 18 and the inner jacket layer 19 of the fiber optic cable 17 when the end portion of the strength layer 18 is removed or loosened from the fiber portion 20.

It has been found that use of a deformable metal of low elasticity for the ferrule 10 permits crimping engagement of the ferrule head 22 onto the insert 12 and the encompassed fiber adequately to assure firm engagement without undue risk of crushing or overstressing the fiber during the crimping step.

The buffer ferrule subassembly 15 also includes the annular gripping insert 12, best shown in FIGS. 1-3, placed within the head portion 22 of the ferrule 10. The buffer ferrule 10 and the gripping insert 12 are crimped directly onto the fiber portion 20 in order to effectuate a suitable connection. Preferably, the gripping insert 12 is fabricated of polyethersulfone (PES) and the coatings on the engaged portion of fiber are removed to provide a bare glass fiber engagement portion of the fiber prior to assembly. This has been found to provide an excellent gripping action over a wide operating range of temperatures between minus 55° C. to well over 200° C. Other materials may be substituted in place of PES provided they have a high coefficient of friction on the fiber and are formable and suitably resilient.

Advantageously, the gripping insert 12 permits minimized pistoning and vibration of fiber portion 20. For example, when such a buffer ferrule 10 is crimped onto such an insert about 1/16" long and the enclosed fiber portion in the manner described herein, the insert 12 resists tension on the engaged fiber portion 20, e.g. up to approximately two pounds of force on the engaged fiber portion 20. Such a retention force is adequate for maintaining the optical fiber in position against forces typically encountered in thermal cycling and vibration. The buffer ferrule subassembly 15, however, must not transfer too great a compressive force to the optical fiber 20 to avoid the problem of crushing or otherwise overstressing the glass fiber.

It has been found that the buffer ferrule 10 may be fabricated of stainless steel of high hardness, e.g. a Rockwell B scale of 92-95 to minimize elasticity and obtain a high degree of strength when compressively deformed onto the insert 12 and encompassed fiber by crimping.

As best shown in FIG. 2, the crimp sleeve 14 is placed in surrounding relation to the strength layer 18 over the serrated gripping portion 24 of the buffer ferrule 10 to "tie off" the strength layer 18. The sleeve 14 preferably is formed of a metal or a similar material which, like the buffer ferrule 10, is non-elastically deformable to effect crimping retention of the enclosed layers. Thus, when the sleeve 14 is thereafter compressed, the strength layer 18 is securely held between the serrated portion 24 and the sleeve 14. In the preferred embodiment, the sleeve 14 and outer body 36 are also fabricated of a stainless steel, e.g., 302 EZ or 303, hardness not being as significant for these components.

The end surface 28 serves as a reference plane or surface for determining the plane of cleaving the fiber 20 after the fiber is gripped in the subassembly 15.

FIGS. 2 and 5 also show the outer body 36 of the pin terminus 8, which has a cavity therethrough to receive the various components. The outer body 36 includes an annular sleeve portion 38 that forms a receptacle to receive the ferrule subassembly 15 and respective gripped fiber portion 20 of the cable 17. The outer terminus body 36 also includes a central bore portion 33, a pin end portion 35 and a reference stop surface 32 located at a predetermined distance from the inwardly disposed proximal surface of a lens 34 which is mounted within the outer pin end portion 35. In the preferred embodiment, the lens 34 may be either a gradient index rod lens or a precision ball lens. When the ferrule subassembly is mated within the outer terminus body 36, the end reference surface 28 of the buffer ferrule 10 abuts the reference stop surface 32 of the terminus body 36. The reference surface 28 thereby serves as a reference surface both for cleaving the end of the fiber 20 and for positioning the fiber cable 17 and the ferrule assembly 15, which results in highly accurate positioning of the end of the fiber 20 relative to the lens 34.

Thus, simply by cleaving the fiber portion 20 of the fiber optic cable 17 at an appropriate predetermined distance from the reference end surface 28 of the buffer ferrule 10 in the subassembly stage, the end of the fiber portion 20 will be precisely positioned within the focal zone of the lens 34 when the terminus is assembled. Such alignment is necessary to obtain an efficient optical interconnection.

After the entire ferrule and cable assembly 15 is placed within the annular sleeve portion 38 of the outer terminus body 36, the annular portion 38 is crimped to clamp the underlying layers of the strength material 18 and the sleeve 14 onto the serrated portion 24 of the ferrule 10, with corresponding crimp deformation also of the sleeve 14. This arrangement provides strong strain relief retention for the cable to the terminus housing 36 on the order of approximately 50 pounds. The resulting strong mechanical interconnection of the strength member 18 between the ferrule 24 and the terminus body 36 provides strain relief against external forces on the cable being imposed on the fiber, such as tension forces and vibrational forces. Thus, this strong interconnection fixes the subassembly 15 in position as with the reference surfaces 28 and 32 in abutment with one another, to maintain the cleaved end of the fiber in its desired position relative to the lens 34 despite external stresses transmitted through the cable or the housing 36.

It will be appreciated that another advantage of the present invention is that a defective termination of the fiber cable 17 results in a minimum loss of componentry. Since the outer body 36 of pin terminus 8 is mated with the ferrule and cable assembly after termination of the fiber cable 17, any shortcomings in the mechanical or optical termination of fiber cable 17 result only in the loss of ferrule 10 and not in the loss of the entire pin terminus 8.

Lateral alignment of the fiber portion 20 in connection with the lens 34 is provided by a precision fiber guide 44 which fits within the pin section 35 adjacent the lens 34. The fiber guide 44 may, for example, be fabricated of sapphire or ceramic. The alignment advantages of such material will be appreciated by those skilled in the art. Adjacent the fiber guide 44 is the alignment sleeve 42 which also is mounted in the pin end portion 35. The alignment sleeve 42 mechanically secures the fiber guide 44 in proper alignment and also provides a passive guide for the fiber portion 20 entering the alignment sleeve 42.

The pitch of the lens 34 is chosen so that the fiber portion 20 must be a small distance from the lens 34 in order for the image to be properly focused. One important advantage of this arrangement is that the fiber portion 20, when cleaved, never comes in contact with the lens 34. Damage to the lens 34, either during termination of the fiber optic cable 17 or during subsequent environmental or mechanical stress, is thereby avoided.

Figure 6:
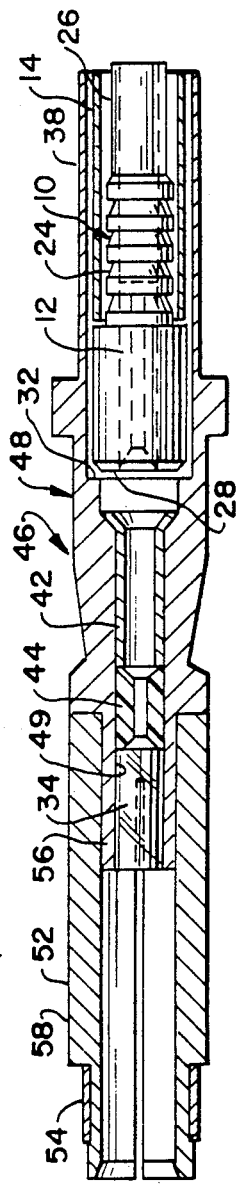
FIG. 6 is a cross sectional view of a corresponding complementary socket assembly which mates with the pin assembly of FIG. 4 to form a fiber optic termination employing the present invention.
Figure 7:
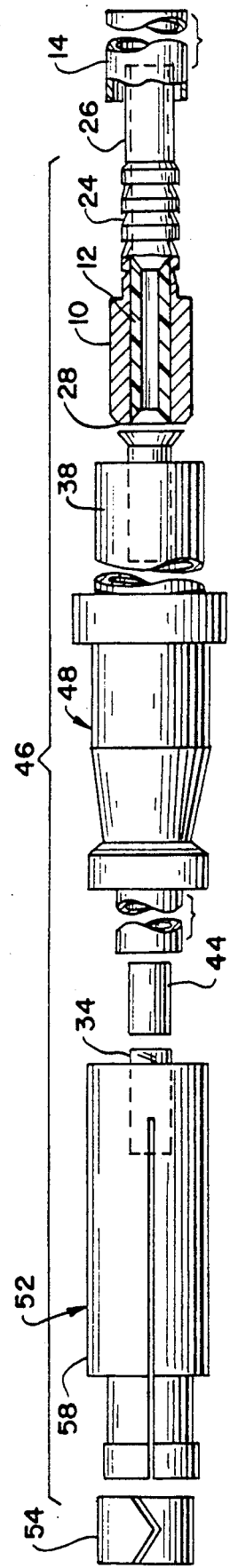
FIG. 7 is an exploded cross sectional view of the socket assembly of FIG. 6.

The other half of the optical interconnection is provided by a socket terminus assembly 46, shown in FIGS. 6 and 7 which is generally similar to the aforedescribed pin terminus in the manner of engaging the respective optical fiber and cable, but with appropriate modifications in the outer housing portions for complementary mating with a pin terminus 8. The socket assembly 46 includes an outer body 48 which is similar to the body 36 of the pin terminus 8, but modified in certain respects to a socket configuration for its mating engagement with the pin terminus 8. Thus, it also receives an alignment sleeve 42, fiber guide 44 and lens 34 within its socket bore 49. The fiber and cable are gripped in the same manner in an identical subassembly 15. Thus, as with pin assembly 8, socket assembly 46 includes a buffer ferrule 10, insert 12 and a crimp sleeve 14. The location and operation of these elements are the same as described in connection with pin assembly 8.

A coupler sleeve 52 and "napkin" or clamping ring 54 are provided for joining the pin and socket connectors 8 and 46. The coupler sleeve 52 is pre-fitted over a cylindrical end portion 56 of socket assembly 46 and includes a resilient split barrel portion 58 to receive the cylindrical pin end section 35 of the pin assembly 8, to provide a mating interconnection between socket assembly 46 and pin assembly 8. The ring 54 is thereafter compressed over the end of the coupler sleeve which engages connector 8 to conveniently secure this interconnection. When the coupler sleeve 52 is in place, the interconnection provides lateral and angular alignment of the two termini 8 and 46 and thus of the mating fibers. The telescopic connection afforded by the coupler sleeve allows for variations in the relative longitudinal positions of the termini 8 and 46, such as may be attributable to tolerances in the connectors in which the termini are supported.

While particular outer shapes for the housings 36 and 46 are disclosed, a variety of different termini housing shapes may be provided. The outer geometry of the termini will, of course, be dictated by constraints of the various interconnecting housings depending on the particular application. By employing the teachings of the present invention, the termini may fit within a small profile, such as for fitting within the envelope of space allowed for a conventional electrical contact, as in a hybrid connector.

To effect termination of an optical fiber in either terminus, the respective sleeve 14 is first prepositioned over the outer layer 16 of the fiber optical cable 17. The outer layer 16 of the cable 17 is removed from the distal end portion of the cable 17. The strength layer 18 is thereafter pulled away from the inner jacket 19. The inner jacket 19 is removed from the fiber to expose a bare portion of the optical fiber 20 and the fiber is preferably cleaned of any remaining coating.

The buffer ferrule subassembly, including the ferrule 10 and gripping insert 12, is then assembled directly onto the cable, with the serrated gripping portion 24 and the tail portion 26 sliding over the inner jacket 19 until the tail portion 26 abuts an unremoved portion of the strength layer 18. In this operation, the fiber portion 20 is threaded through the insert 12 in the buffer end 22. It has been found that preparation of the fiber surface with a chemical agent may enhance the fiber strength and improve the engagement of the gripping insert 12. The head portion 22 of the buffer ferrule 10 is then crimped or otherwise compressed radially inward to compress the insert 12 against the exposed fiber portion 20 for gripping the fiber. The dimensions and conditions of the insert 12 preferably are controlled such that the insert 12 does not project from the end of the ferrule 10. Some elongation of the insert 12, particularly along the fiber surface 20, will typically occur. Once the buffer ferrule 10 is crimped onto the fiber portion 20, the end reference surface 28 of the ferrule 10 provides a reference plane relative to the gripped fiber for subsequent operations. These include scribing and cleaving the fiber at a fixed predetermined distance from the end surface 28 which take place after the strength layer is secured to the ferrule 10.

Thereafter, the strength layer 18 is urged forward over the buffer ferrule 10. The crimp sleeve 14 is advanced over the serrated gripping portion 24 of the ferrule 10, and the outer ends of the strength layer 18 are folded back over the outer surface of the crimp sleeve 14, as best seen in FIG. 2.

The assembled fiber and ferrule assembly is then advanced within the annular sleeve 38 of the outer terminus body 36. This fiber and ferrule assembly is advanced until the reference surface 28 abuts a reference stop surface 32 in the terminus body 36. This operation precisely positions the end of the fiber portion 20 within the focal zone of the lens 34. The annular portion 38 of the terminus body which surrounds the sleeve 16 and respective portions of the strength elements 18 is then crimped or otherwise deformed inward to clamp the underlying layers of the strength material 18 and the sleeve 14 onto the ferrule gripping portion 24 for strain relief retention of the fiber contact assembly. In this arrangement, the two layers of the strength material 18 are clamped between the metal layers 24, 14, and 36.

From the description thus far provided, a fiber optic connector that meets the aforestated objectives by providing a simple crimp and cleave assembly without the use of epoxies or other fillers has been described. It will be apparent that the proposed fiber optic connector may be used in a number of applications and that a number of modifications can be made in the invention disclosed, particularly by those having the benefit of the foregoing teachings, without departing from the spirit of these principles. For example, it will be understood that the mode of crimping and engaging the fiber portion 20 in the buffer ferrule subassembly 15 may be utilized in assemblies where there is no joinder of the strength layer 18 to the ferrule 10, for example where the individual fibers are part of a multi-fiber cable having a single strength layer which is secured to other components of a connector. Also, the stress relief gripping arrangement may be utilized with other fiber holders. However, these features preferably are utilized together in the advantageous assembly described herein. Accordingly, while the invention disclosed herein has been described with reference to the presently contemplated best mode for practicing the invention, it is intended that this invention be limited only by the scope of the appended claims.

What is claimed is:

1. A fiber optic terminus positioning assembly for closely controlling the axial position of an optical fiber end in a fiber optic connector, said terminus assembly comprising a single optical fiber having a bare portion of said fiber free of covering and coating, said bare portion having a terminal end, a resilient fiber gripper element of a material which has a high coefficient of friction with the material of which said fiber is formed, said gripper element being distinct from any such fiber covering or coating and in direct surface-to-surface contact with the surface of said bare portion of said fiber, and a metal support element surrounding said fiber portion and said gripper element in a predetermined axial position relative to said terminal end, said support element being in compressive engagement with said gripper element and thereby compressing said gripper element into gripping engagement with said bare fiber portion for retaining said terminal end of said fiber in said predetermined axial position relative to said support element.

2. The invention as in claim 1 wherein said support element forms a unitary continuous annulus around said gripper element and said fiber portion and is formed of a hard material having a low coefficient of elasticity and includes at least a part thereof which is inelasticity deformed inwardly to effect such compressive engagement with said gripper element.

3. The invention as in claim 2 wherein said fiber is formed of glass and said gripper element is composed of polyethersulfone.

4. The invention as in claim 3 wherein said support element is composed of stainless steel.

5. The invention as in claim 2 wherein said support element is composed of stainless steel.

6. The invention of claim 2 wherein said gripper element is a unitary continuous sleeve surrounding said bare portion of said fiber, and said support element is a unitary continuous sleeve portion surrounding said gripper element.

7. The invention of claim 1 wherein said optical fiber is covered substantially throughout its length by a protective covering, said covering having a proximal terminal end, said bare portion projecting beyond said proximal terminal end of said covering, and said resilient fiber gripping element is located on said bare portion beyond said proximal terminal end of said covering.

8. The invention of claim 7 wherein said terminus assembly includes first mating means, said fiber optic connector including a complimentary terminus assembly with second mating means for engaging said first mating means to form a fiber optic connection, said terminal end of said bare portion projecting to a predetermined axial distance in relation to said complimentary terminus assembly when said first and second mating means are engaged.

9. A terminus assembly for use in an optical fiber connector by securing, at a predetermined distance from a lens surface, a fiber optic cable having a fiber surrounded by a strength layer with at least a portion thereof removed from said fiber to expose a portion of said fiber comprising:

a radially deformable ferrule for placement between said exposed fiber portion and said removed strength layer, said ferrule having a head section with a reference surface at its distal end and a tail section, an insert disposed within said head section and having a centrally disposed aperture therethrough for receiving said fiber portion, said insert being resilient and compressible into gripping engagement with such a fiber disposed in said aperture, said head section engaging and compressing said insert with said fiber portion therein when deformed radially inward, and a terminus body having a cavity therethrough and a compressible annular portion for receiving said ferrule means, an optical coupler lens disposed in said cavity and having opposite end surfaces exposed therewithin, said terminus body including a reference stop fixed at a preselected distance from said lens for engagement by said reference surface of said ferrule whereby an end of a fiber retained in said ferrule by said insert will be in a predetermined position relative to the proximal surface of said lens when said reference surface abuts said terminus body reference stop and said annular portion is compressed to retain said ferrule means and said contact sleeve in position with said reference stop against said reference surface.

10. The invention of claim 9 further comprising a deformable sleeve member received within said annular portion and over said tail section for engaging said removed strength layer with said tail section when said strength layer is disposed over said tail section and said sleeve member is compressed radially inward.

11. The invention of claim 10 wherein said ferrule means and said sleeve member are fabricated of stainless steel.

12. The invention of claim 11 wherein said contact body is fabricated of stainless steel.

13. A terminus assembly including the assembly as in claim 10 and a fiber optic cable including an optical fiber and a strength layer, a portion of said strength layer being disposed between said tail portion of said ferrule and the inside surface of said sleeve member and then back folded between the outside surface of said sleeve member and the inside surface of said annular portion of said contact body to provide multiple locations of gripping engagement with said strength layer when said annular portion and said sleeve member are compressed radially inward.

14. The invention as in claim 13 wherein said ferrule, said sleeve member and said terminus body are of stainless steel.

15. The invention of claim 9 wherein said radially compressible insert is fabricated of polyethersulfone to reduce vibration of said fiber and to promote operability over a wide temperature range.

16. The invention of claim 9 wherein said terminus assembly includes first mating means, said fiber optic connector including a complimentary terminus assembly with second mating means for engaging said first mating means, said terminal end of said bare portion projecting to a predetermined axial distance in relation to said complimentary terminus assembly when said first and second mating means are engaged.

17. A terminus assembly for use in forming a termination of a fiber optic cable which includes an optical fiber and a flexible strength layer surrounding said fiber, said assembly comprising a metal support element formed of a deformable metal having a low coefficient of elasticity and having a cavity therethrough, a resilient fiber gripper element of a material which has a high coefficient of friction with the material of which said optical fiber is formed, said gripper element being mounted in said cavity in a first portion of said support element and being of a configuration to receive a portion of such an optical fiber therethrough and to be disposed between such fiber received therein and the inner surface of said cavity, whereby said first portion of said support element and said gripper element may be compressed for thereby compressing said gripper element into resilient gripping engagement with said fiber portion for retaining such a fiber in a predetermined position relative to said support element, said metal support element including a further portion at one end thereof including an annular wall of a configuration to receive such a strength layer thereover, an inelastically deformable metal sleeve of a size and configuration to be disposed in surrounding relation to such a strength layer over said further portion, and a metal housing for surrounding said support element and including a crimp portion to be disposed over said sleeve and a further layer of such strength layer overlying said sleeve when said sleeve is assembled over said further portion, and said crimp portion being inelastically deformable, whereby said crimp portion and said sleeve may be crimped radially inward to effect gripping engagement of such layers of strength material between said further portion and said sleeve and between said sleeve and said crimp portion for strain relief engagement of said cable to said support element and positioning retention of said fiber by said gripper element.

18. A method of forming a terminus assembly for an optical fiber provided with coating and covering layers comprising the steps of removing the coverings and coatings from a portion of said fiber to form a bare portion of said fiber providing a fiber support housing element formed of a hard metal having a low coefficient of elasticity and having a cavity therethrough, providing a gripper element formed of an elastic material having a high coefficient of friction with said bare portion of said fiber, positioning said gripper element and said optical fiber in said cavity with said gripper element in surrounding relation to said bare portion of said fiber, crimping at least a portion of said support housing element circumjacent said gripper element to inelastically deform said portion of said support housing element and thereby compressing said gripper element into firm resilient surface-to-surface contact with said bare portion of said fiber in position in said terminus assembly and, forming a terminal end of said fiber at a predetermined longitudinal position relative to said support housing element.

19. The invention as in claim 18 wherein said fiber is formed of glass and said gripper element is composed of polyethersulfone.

20. The invention as in claim 19 wherein said support housing element is composed of stainless steel.

21. The invention as in claim 18 wherein said support housing element is composed of stainless steel.

22. A method for positioning a fiber optic cable having a fiber surrounded by a strength layer at a predetermined distance from a lens surface to provide one half of an optical connection comprising the steps of:

separating said strength layer from said fiber along an end portion of said fiber optic cable to expose a portion of said fiber;

threading a ferrule between said fiber and said strength layer, said ferrule having a compressible head section including a compressible insert with an aperture to receive said exposed fiber portion and a reference edge at its distal end, said ferrule having a tail section with serrations along at least a portion thereof;

compressing said head section to firmly engage said insert with said fiber;

advancing a sleeve over said strength layer to surround said serrated portion;

folding said strength layer over the outer surface of said sleeve member;

advancing said ferrule within a terminus body having an annular section for receiving said ferrule, said terminus body having a reference stop whereby when said ferrule reference edge abuts said terminus body reference stop said fiber is aligned with said lens surface; and compressing said terminus body annular section to engage the inside surface of said terminus body annular section with said strength layer thereunder and to engage said strength layer with said sleeve member and to engage said strength layer with said tail portion.

23. A fiber optic connector comprising:

a pin terminus assembly for securing, at a predetermined distance from a lens surface, a first fiber optic cable having a fiber surrounded by a strength layer with at least a portion thereof removed from said fiber to expose a portion of said fiber, said pin terminus assembly including first radially deformable ferrule means for placement between said exposed fiber portion and said removed strength layer, said first ferrule means having a head section with a reference surface at its distal end and a tail section, a first insert disposed within said head section and having a centrally disposed aperture therethrough for receiving said fiber portion, said insert being resilient and compressible into gripping engagement with such a fiber disposed in said aperture, said head section engaging and compressing said insert with said fiber portion therein when deformed radially inward, and a pin terminus body having a cavity therethrough and a compressible annular portion for receiving said first ferrule means, a first optical coupler lens disposed in said cavity and having opposite end surfaces exposed therewithin, said pin terminus body including a reference stop fixed at a preselected distance from said first lens for engagement by said reference surface of said ferrule whereby an end of a fiber retained in said ferrule by said insert will be in a predetermined position relative to the proximal surface of said lens when said reference surface abuts said terminus body reference stop and said annular portion is compressed to retain said ferrule means and said contact sleeve in position with said reference stop against said reference surface; and a socket terminus assembly for securing, at a predetermined distance from a lens surface, a second fiber optic cable having a fiber surrounded by a strength layer with at least a portion thereof removed from said fiber to expose a portion of said fiber, said socket terminus assembly including second radially deformable ferrule means for placement between said exposed fiber portion and said removed strength layer, said second ferrule means having a head section with a reference surface at its distal end and a tail section, a second insert disposed within said head section and having a centrally disposed aperture therethrough for receiving said second fiber portion, said second insert being resilient and compressible into gripping engagement with such a fiber disposed in said aperture, said head section engaging and compressing said second insert with said fiber portion therein when deformed radially inward, and a socket terminus body having a cavity therethrough and a compressible annular portion for receiving said second ferrule means, a second optical coupler lens disposed in said cavity and having opposite end surfaces exposed therewithin, said socket terminus body including a reference stop fixed at a preselected distance from said lens for engagement by said reference surface of said ferrule whereby an end of a fiber retained in said second ferrule means by said insert will be in a predetermined position relative to the proximal surface of said second lens when said reference surface abuts said terminal reference stop and said annular portion is compressed to retain said second ferrule means and said contact sleeve in position with said reference stop against said reference surface, said socket body engaging said pin body to align said first lens with said second lens so that light emerging from said first fiber may be projected from said first lens to said second lens.

* * * * *

UNITED STATES PATENT AND TRADEMARK OFFICE
CERTIFICATE OF CORRECTION

PATENT NO. : 5,142,602

DATED : August 25, 1992

INVENTOR(S) : Cabato et al.

It is certified that error appears in the above-identified patent and that said Letters Patent is hereby corrected as shown below:

Title Page

References Cited

Delete U.S. Patent No. 3,679,895 to Huber, issued 7/1987, wrong patent no., should be 4,679,895 which is already cited.

U.S. Patent 4,300,815 to Malsot, date issued should be "November (11)1981" and not "May (5)/1981".

Signed and Sealed this

Twenty-first Day of September, 1993

Attest:

BRUCE LEHMAN

*Attesting Officer*   *Commissioner of Patents and Trademarks*